UNITED STATES PATENT OFFICE.

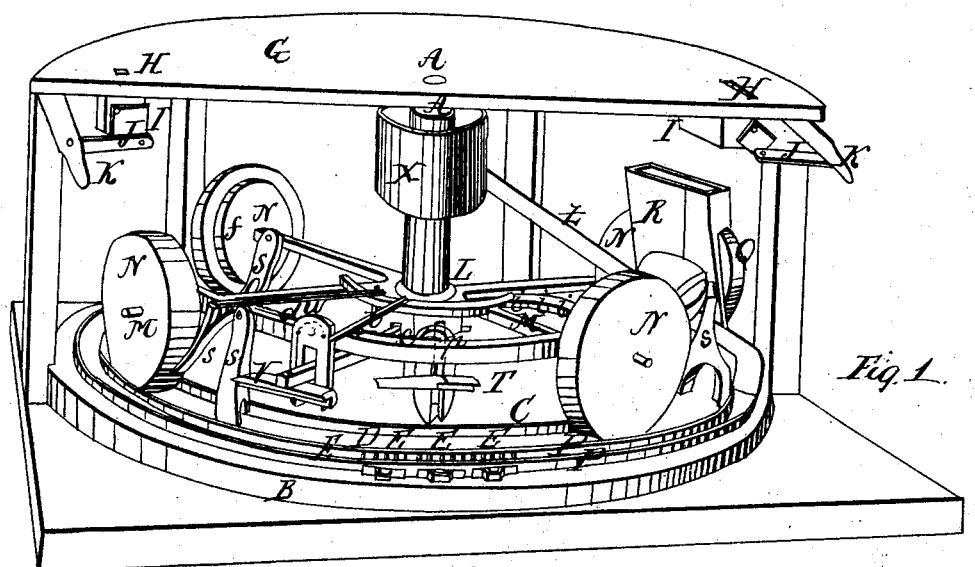
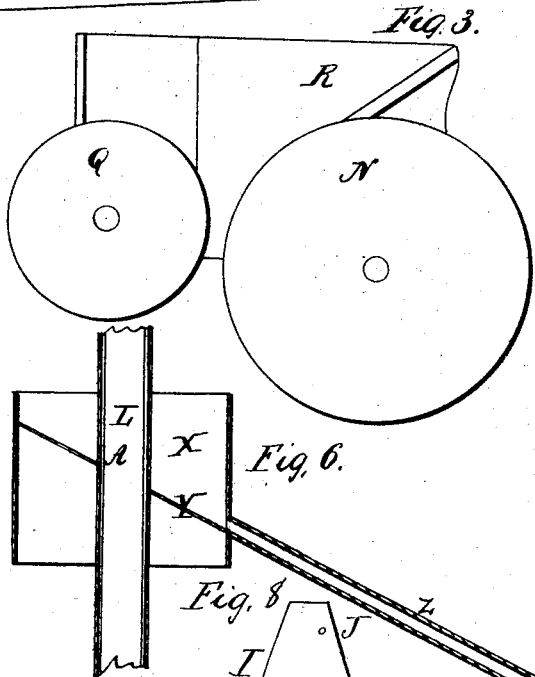
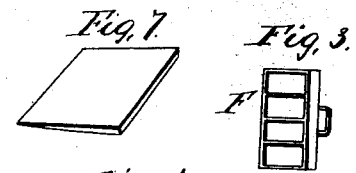
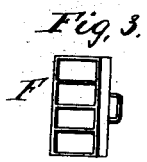
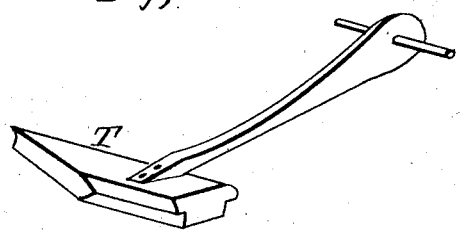
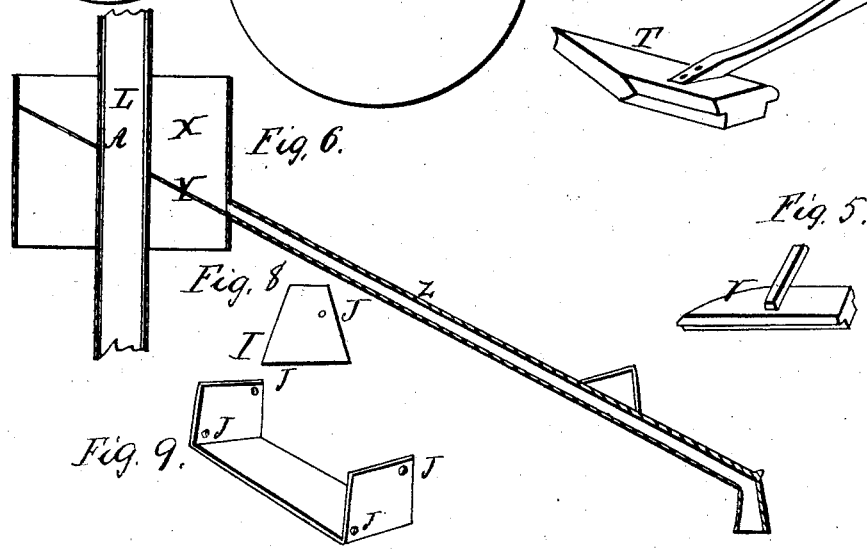

SAMUEL B. BRUSSTAR, OF KENSINGTON, PENNSYLVANIA.

MACHINE FOR MAKING BRICKS.

Specification of Letters Patent No. 693, dated April 14, 1838.

*To all whom it may concern:*

Be it known that I, SAMUEL B. BRUSSTAR, of the Kensington district, of the Northern Liberties, Philadelphia county, State of Pennsylvania, have invented a new and useful machine for making bricks, called "Brusstar's self-feeding, revolving, trundling, shearing, sanding, and brick pressing and clay tempering machine," which is described as follows, reference being had to the annexed drawings of the same making part of this specification.

This machine consists of a post A, Figure 1, planted in the ground of sufficient strength for the purposes hereafter mentioned. Around this post is constructed a circular foundation B of timber or stone about four feet wide and one foot deep, the diameter of the inner circle being about twenty-two feet, within which is formed a horse track C of about twenty feet diameter. Upon this foundation are laid pieces of timber or sleepers, each about 18 inches long, 1 inch wide, and 2¾ of an inch deep, set edgewise, with their inner ends flush with the inner circle and about 7 or 8 inches apart, radiating from the center of the circle. Upon these pieces of timber is formed a circular trough D 18 inches wide and about 3 inches deep. The sides of this trough consist of circular rails set upon the before mentioned timbers. In this trough the clay is tempered and is therefore called the tempering trough. The outer ends of the sleepers or the ends fartherest from the center of the circle serve as stops for the mold. The spaces 1 1 1 between them answer for the discharge of accumulated clay into the center. Outside of the tempering trough is another circular trough E about 10 inches wide and 2¾ inches deep under which the molding is performed; this is called the molding trough. Under this trough are placed on edge wedge shaped pieces or partitions about 20 inches apart forming chambers for the molds. In the molding trough is thrown the clay for making the bricks.

The molds F, Figs. 1 and 3, are made of metal containing each four apartments for four bricks having a handle on one side by which it is drawn out from and pushed into the chambers, under the molding trough through spaces formed in the rail, forming the outer edge of the trough. Only three are drawn. The molding trough all around is furnished with similarly constructed molds.

Over the circular foundation and base walk is erected a circular platform G, Fig. 1, upon posts about ten feet high, framed of suitable timber and covered with thick plank. On this platform is deposited the clay for the bricks, hauled up an inclined plane by horses or otherwise. The upper ends of the posts may project above the platform to form a railing. The center post acts as a support for the center of the platform. In the platform are two oblong openings H in which are constructed boxes I to receive the clay, made flaring downward and projecting below the platform a sufficient distance; the bottom of each moving on pivots J by means of levers K for discharging the clay. Around the post is put a loose collar L flanged at its lower end, to which are fastened four or more arms M radiating from the center, having on the outer end of each a wheel N about 5 feet diameter, and 1 foot thick, weighing above 4 or 500 pounds. Three of these wheels revolve in the inner or tempering trough for tempering the clay. The fourth wheel N revolves in the outer or molding trough for molding and pressing the bricks having flanges *f* to turn on the rails P to prevent its pressing upon the edges of the molds so as to destroy them.

In front of one of the wheels of the inner trough is a fifth or smaller wheel Q, which acts as a regulator and feeder. See Figs. 1 and 3. Over and around these two wheels is constructed a traveling hopper R to receive the clay from the discharging boxes I. To a suitable framing on the arms and between the several wheels are attached plows S placed in the inner trough for turning the clay to the center thereof to be pressed or acted upon by the tempering wheels N in moving over it. Over the inner trough and attached to the before described frame is a shear T, Figs. 1 and 4, for throwing the clay into the outer trough—to be let down or raised by means of a lever U, cord *c*, and pulley *p* or otherwise. The forward end is made of a triangular shape so as to throw the clay to the left. Over the outer trough and attached to said frame is a strike shear V Figs. 1 and 5 to strike the brick and throw back the surplus clay into the tempering trough; it is let down or raised by means of a lever W, cord d and pulley, and is made of a triangular shape for throwing the clay to the right.

To the upper end of the collar is fastened a receiver X Figs. 1 and 6 for sand having an inclined bottom Y and trough Z for conducting the sand to the molds—the lower and outer end of which is covered with a sieve, a to arrest the larger particles of the sand.

The horses for operating the machine are attached to the arms and travel around in the horse track.

Under the molds is a false bottom Fig. 7 for keeping the molds up even with the tops of the partitions; it is made of a wedge shape on the under side in order to force the molds up even with the bottom of the molding trough.

Behind the wheels are scrapers s, Fig. 1, fastened to the frame for keeping the wheels clean.

Operation: The clay is hauled up and deposited upon the circular platform G. It is then thrown into the boxes I with movable bottoms; the bottom of the box over the feeding wheels is turned by the levers K attached to it which empties the clay into the traveling hopper from whence it passes between the wheels N, Q, into the tempering trough D in an even layer oven which the hind wheel turns and flattens it out—as the horses move around with the wheels N: it is then met by one of the double plows S which turns it to the center. The next wheel then passes over it and again flattens it, the plow behind this wheel again turns it to the center of the trough and so on until it be sufficiently tempered. The shear T for throwing the clay to the left is then let down by means of the cord, pulley, and weight, into the tempering trough and from its triangular shape and forward movement turns the clay over into the molding trough E. From this trough it is pressed into the molds by the pressing wheel N revolving in said trough—the molds having previously been inserted into the chambers to which they belong. The shear and striker V is then let down into the molding trough, which, as it moves forward strikes the brick and turns the surplus clay again into the tempering trough D. The molds are then drawn out from the chambers, the bricks off-borne, and the empty molds replaced.

When the shear and striker are not in use they are raised from the troughs and secured by placing the levers against pins 3 or stops in the frame.

The sanding of the molds is performed by means of the inclined tube Z and screen a before described Figs. 1 and 6.

On the arrival of the traveling hopper R beneath the other discharging box I the same operation takes place as that before described.

The near half of the circular platform is omitted to be represented in the drawing in order to show the arrangement of the several parts of the machine.

The invention claimed and desired to be secured by Letters Patent in the before described machine for making bricks consists, in—

The wheels and plows for tempering the clay—the traveling hopper and discharging wheels for spreading the clay evenly in the tempering trough—the shear for turning the clay from the tempering into the molding trough—the shear and striker for striking the brick and turning the surplus clay back into the tempering trough—the sanding apparatus—the arrangement of the sliding molds and the chambers into which they are inserted under the molding trough—the spaces formed under the tempering trough through which any accumulated clay may be discharged into the horse walk—also the discharging boxes—the whole in combination as before described.

SAML. B. BRUSSTAR.

Witnesses:
 THOMAS BRUSTER,
 SAND WEYANT.